United States Patent
Tanaka et al.

(10) Patent No.: US 10,597,485 B2
(45) Date of Patent: Mar. 24, 2020

(54) PRODUCTION METHODS FOR GLASSY LIQUID-CRYSTALLINE EPOXY RESIN AND GLASSY LIQUID-CRYSTALLINE EPOXY RESIN COMPOSITION, STORAGE METHODS FOR LIQUID-CRYSTALLINE EPOXY RESIN AND LIQUID-CRYSTALLINE EPOXY RESIN COMPOSITION, GLASSY LIQUID-CRYSTALLINE EPOXY RESIN AND GLASSY LIQUID-CRYSTALLINE EPOXY RESIN COMPOSITION, LIQUID-CRYSTALLINE EPOXY RESIN AND LIQUID-CRYSTALLINE EPOXY RESIN COMPOSITION, AND PRODUCTION METHOD FOR CURED EPOXY RESIN

(71) Applicant: Hitachi Chemical Company, Ltd., Chiyoda-ku, Tokyo (JP)

(72) Inventors: Shingo Tanaka, Tokyo (JP); Tomoko Higashiuchi, Tokyo (JP); Naoki Maruyama, Tokyo (JP); Kazumasa Fukuda, Tokyo (JP); Yoshitaka Takezawa, Tokyo (JP); Fusao Hojo, Tokyo (JP)

(73) Assignee: HITACHI CHEMICAL COMPANY, LTD., Chiyoda-ku, Tokyo (JP)

( * ) Notice: Subject to any disclaimer, the term of this patent is extended or adjusted under 35 U.S.C. 154(b) by 0 days.

(21) Appl. No.: 16/477,353

(22) PCT Filed: Oct. 17, 2017

(86) PCT No.: PCT/JP2017/037604
§ 371 (c)(1),
(2) Date: Jul. 11, 2019

(87) PCT Pub. No.: WO2019/077688
PCT Pub. Date: Apr. 25, 2019

(65) Prior Publication Data
US 2019/0375885 A1    Dec. 12, 2019

(51) Int. Cl.
*C08G 59/02*  (2006.01)
*C08G 59/24*  (2006.01)
*C08G 59/50*  (2006.01)

(52) U.S. Cl.
CPC ......... *C08G 59/245* (2013.01); *C08G 59/504* (2013.01); *C08G 2250/00* (2013.01)

(58) Field of Classification Search
CPC .............. C08G 59/245; C08G 59/5033; C08G 59/621; C08L 63/00
See application file for complete search history.

(56) References Cited

U.S. PATENT DOCUMENTS

2017/0349695 A1\* 12/2017 Katagi ..................... C08J 5/18

FOREIGN PATENT DOCUMENTS

| JP | H4-233935 A | 8/1992 |
| JP | 2002-212265 A | 7/2002 |
| JP | 2015-48400 A | 3/2015 |
| JP | 2016-113540 A | 6/2016 |
| WO | 2016104772 \* | 6/2016 |
| WO | WO-2016/104772 A1 | 6/2016 |
| WO | WO-2017/066929 A1 | 4/2017 |
| WO | WO-2017/145410 A1 | 8/2017 |

OTHER PUBLICATIONS

Principle and Application of Differential Scanning Calorimeter (DSC), Japan, May 10, 2012, pp. 1-4, including English abstract.
Szczepaniak B., et al., "Liquid Crystalline Epoxy Resins by Polyaddition of Diglycidyl Ether of 4,4'-Dihydroxybiphenyl and Difunctional Aromatic Compounds," Journal of Polymer Science Part A: Polymer Chemistry, 1998, vol. 36, pp. 21-29.

\* cited by examiner

*Primary Examiner* — Kuo Liang Peng
(74) *Attorney, Agent, or Firm* — Faegre Drinker Biddle & Reath LLP

(57) ABSTRACT

A production method for a glassy liquid-crystalline epoxy resin, comprising a process of cooling a liquid-crystalline epoxy resin to cause transition into a glassy state.

15 Claims, 1 Drawing Sheet

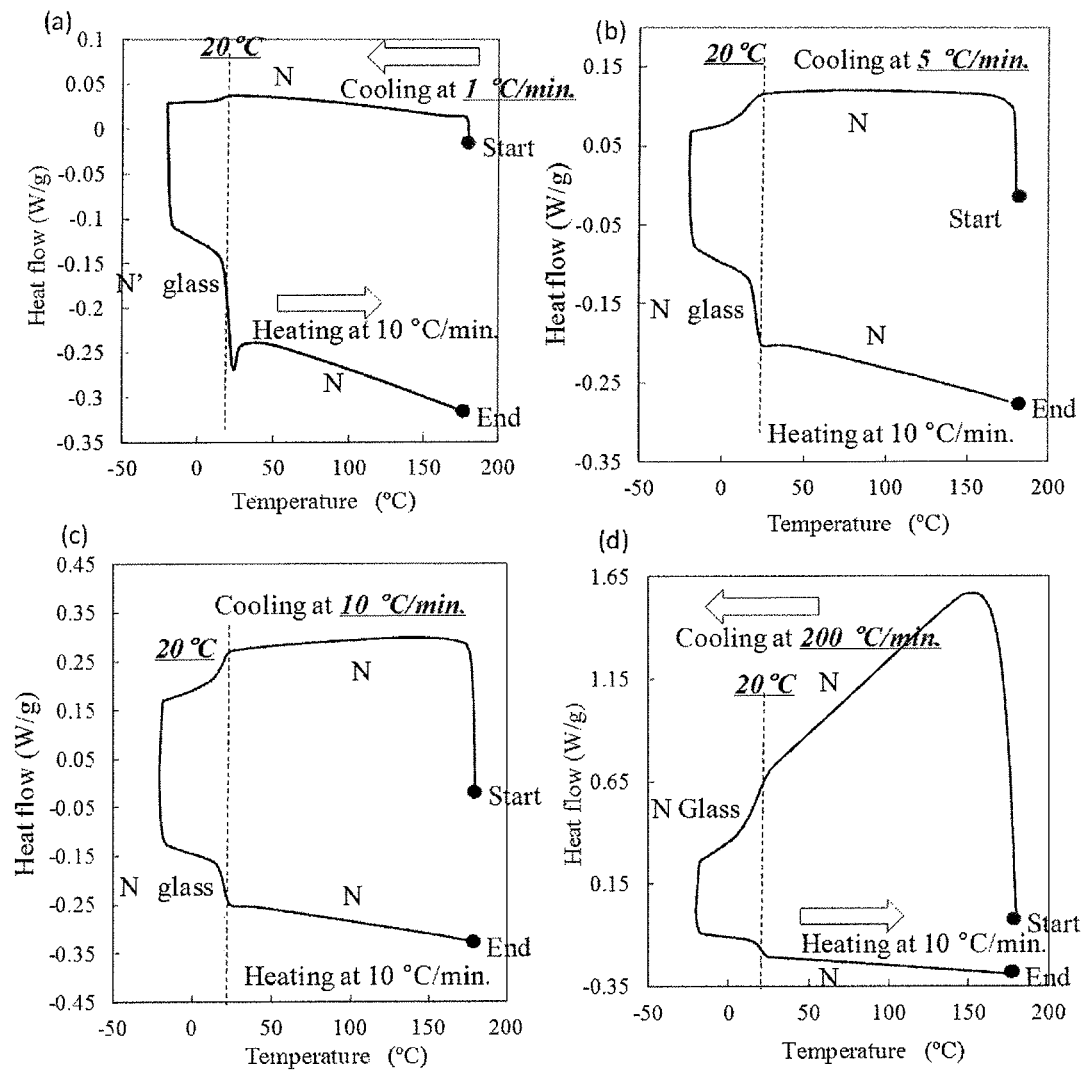

PRODUCTION METHODS FOR GLASSY LIQUID-CRYSTALLINE EPOXY RESIN AND GLASSY LIQUID-CRYSTALLINE EPOXY RESIN COMPOSITION, STORAGE METHODS FOR LIQUID-CRYSTALLINE EPOXY RESIN AND LIQUID-CRYSTALLINE EPOXY RESIN COMPOSITION, GLASSY LIQUID-CRYSTALLINE EPOXY RESIN AND GLASSY LIQUID-CRYSTALLINE EPOXY RESIN COMPOSITION, LIQUID-CRYSTALLINE EPOXY RESIN AND LIQUID-CRYSTALLINE EPOXY RESIN COMPOSITION, AND PRODUCTION METHOD FOR CURED EPOXY RESIN

TECHNICAL FIELD

The present invention relates to production methods for a glassy liquid-crystalline epoxy resin and a glassy liquid-crystalline epoxy resin composition, storage methods for a liquid-crystalline epoxy resin and a liquid-crystalline epoxy resin composition, a glassy liquid-crystalline epoxy resin and a glassy liquid-crystalline epoxy resin composition, a liquid-crystalline epoxy resin and a liquid-crystalline epoxy resin composition, and a production method for a cured epoxy resin.

BACKGROUND ART

Epoxy resins are used for various applications due to excellent heat resistance. In recent years, improvement in thermal conductivity of epoxy resins has been studied in view of increasing use temperature of power devices in which epoxy resins are used.

An epoxy resin that has a mesogenic structure in its molecule and exhibits liquid crystallinity in a cured state (hereinafter, also referred to as a liquid-crystalline epoxy resin) is known to have excellent thermal conductivity. However, liquid-crystalline epoxy resins generally have higher viscosity and lower fluidity as compared with other epoxy resins, and have unfavorable moldability (or requires heating to melt) since the resins are crystallized during storage. For reasons such as these, there is room for improvement in the handleability of liquid-crystalline epoxy resins.

As a liquid-crystalline epoxy resin having improved fluidity, a liquid-crystalline epoxy resin including a multimer, which is formed by reaction of an epoxy monomer having a mesogenic structure and a divalent phenol compound, has been proposed (see Patent Document 1).

PRIOR ART DOCUMENT

[Patent Document 1] International Publication No. 2016-104772

SUMMARY OF THE INVENTION

Problem to be Solved by the Invention

The liquid-crystalline epoxy resin described in Patent Document 1 achieves improved handleability by increasing fluidity by lowering a softening point of the liquid-crystalline epoxy resin to a level of not greater than 100° C. However, the improvement has not been studied from a perspective of controlling a state of the liquid-crystalline epoxy resin during storage.

In view of the above, the present invention aims to provide production methods for a glassy liquid-crystalline epoxy resin and a glassy liquid-crystalline epoxy resin composition that exhibit excellent handleability; storage methods for a liquid-crystalline epoxy resin and a liquid-crystalline epoxy resin composition that exhibit excellent handleability; a glassy liquid-crystalline epoxy resin and a glassy liquid-crystalline epoxy resin composition that exhibit excellent handleability; a liquid-crystalline epoxy resin and a liquid-crystalline epoxy resin composition that exhibit excellent handleability; and a production method for a cured epoxy resin.

Means for Solving the Problem

The means for solving the problem includes the following embodiments.

<1> A production method for a glassy liquid-crystalline epoxy resin, comprising a process of cooling a liquid-crystalline epoxy resin to cause transition into a glassy state.

<2> A production method for a glassy liquid-crystalline epoxy resin composition, comprising a process of cooling a liquid-crystalline epoxy resin composition, the liquid-crystalline epoxy resin composition comprising a liquid-crystalline epoxy resin and a curing agent, to cause transition into a glassy state.

<3> The production method for a glassy liquid-crystalline epoxy resin according to <2>, wherein the liquid-crystalline epoxy resin is a liquid-crystalline epoxy resin in a liquid state that is obtained by heating a glassy liquid-crystalline epoxy resin.

<4> The production method for a glassy liquid-crystalline epoxy resin according to <1> or the production method for a glassy liquid-crystalline epoxy resin composition according to <2> or <3>, wherein the glassy liquid-crystalline epoxy resin or the glassy liquid-crystalline epoxy resin composition has a nematic structure.

<5> The production method for a glassy liquid-crystalline epoxy resin according to <1> or the production method for a glassy liquid-crystalline epoxy resin composition according to <2> or <3>, wherein the transition into a glassy state is caused at 0° C. or higher.

<6> A storage method for a liquid-crystalline epoxy resin, comprising a process of cooling a liquid-crystalline epoxy resin to cause transition into a glassy state.

<7> A storage method for a liquid-crystalline epoxy resin composition, comprising a process of cooling a liquid-crystalline epoxy resin composition, the liquid-crystalline epoxy resin composition comprising a liquid-crystalline epoxy resin and a curing agent, to cause transition into a glassy state.

<8> A glassy liquid-crystalline epoxy resin having a liquid-crystalline structure.

<8> A glassy liquid-crystalline epoxy resin composition, comprising a liquid-crystalline epoxy resin and a curing agent, and having a liquid-crystalline structure.

<10> A liquid-crystalline epoxy resin that is capable of transitioning into a glassy state.

<11> A liquid-crystalline epoxy resin, having an inflection point on a heat flow curve obtained by differential scanning calorimetry (DSC).

<12> A liquid-crystalline epoxy resin composition, comprising a liquid-crystalline epoxy resin and a curing agent, and being capable of transitioning into a glassy state.

<13> A liquid-crystalline epoxy resin composition, comprising a liquid-crystalline epoxy resin and a curing agent, and having an inflection point on a heat flow curve obtained by differential scanning calorimetry (DSC).

<14> A production method for a cured epoxy resin, comprising a process of heating the glassy liquid-crystalline epoxy resin produced by the production method according to <1>, the glassy liquid-crystalline epoxy resin composition produced by the production method according to <2> or <3>, the glassy liquid-crystalline epoxy resin according to <8>, or the glassy liquid-crystalline epoxy resin composition according to <9>, at a temperature at which a curing reaction of the glassy liquid-crystalline epoxy resin or the glassy liquid-crystalline epoxy resin composition is caused.

Effect of the Invention

According to the invention, production methods for a glassy liquid-crystalline epoxy resin and a glassy liquid-crystalline epoxy resin composition that exhibit excellent handleability; storage methods for a liquid-crystalline epoxy resin and a liquid-crystalline epoxy resin composition that exhibit excellent handleability; a glassy liquid-crystalline epoxy resin and a glassy liquid-crystalline epoxy resin composition that exhibit excellent handleability; a liquid-crystalline epoxy resin and a liquid-crystalline epoxy resin composition that exhibit excellent handleability; and a production method for a cured epoxy resin are provided.

BRIEF EXPLANATION OF THE DRAWINGS

FIG. 1 includes graphs showing the results of differential scanning calorimetry (DSC) of liquid-crystalline epoxy resins prepared in the Examples.

EMBODIMENTS FOR IMPLEMENTING THE INVENTION

In the following, the embodiments for implementing the invention are explained. However, the invention is not limited to the embodiments. The elements of the embodiments (including steps) are not essential, unless otherwise stated. The numbers and the ranges thereof do not limit the invention as well.

In the disclosure, the "process" refers not only to a process that is independent from the other steps, but also to a step that cannot be clearly distinguished from the other steps, as long as the aim of the process is achieved.

In the disclosure, the numerical range represented by from A to B includes A and B as a minimum value and a maximum value, respectively.

In the disclosure, the minimum values and the maximum values of the numerical ranges that are described in a stepwise manner may be exchanged with each other. The minimum values and the maximum values of the numerical ranges described therein may be substituted by the values indicated in the Examples.

In the disclosure, when there are more than one kind of substances corresponding to a component of a composition, the content of the component refers to a total content of the substances, unless otherwise stated.

In the disclosure, when a composition includes more than one kind of particles, the particle size of the particles refers to a particle size of a mixture of the particles in the component, unless otherwise stated.

In the disclosure, a "layer" may be formed over an entire region or may be formed over part of a region, upon observation of the region.

In the disclosure, the "epoxy resin" refers to a compound having an epoxy group in its molecule. The "epoxy resin" is a collective concept for epoxy compounds that are not in a cured state. The structure of the epoxy compounds in the epoxy resin may be the same or different from each other. The "epoxy resin composition" refers to a material including an epoxy resin and a component other than an epoxy resin (such as a curing agent or a filler).

<Production method for glassy liquid-crystalline epoxy Resin>

The production method for a glassy liquid-crystalline epoxy resin includes a process of cooling a liquid-crystalline resin to cause transition into a glassy state (cooling process).

A liquid-crystalline epoxy resin is generally in a crystallized state when it is cooled during storage. The glassy liquid-crystalline epoxy resin, obtained by the production method as set forth above, is in a glassy state during storage.

The inventors have found that a glassy liquid-crystalline epoxy resin tends to exhibit excellent handleability (moldability) when it is heated to a temperature for molding, as compared with a liquid-crystalline epoxy resin that is crystallized during storage. As a result, it is found that a product produced from a glassy liquid-crystalline epoxy resin exhibits superior properties such as fracture toughness, as compared with a product produced from a liquid-crystalline epoxy resin that is crystallized during storage.

It is possible to achieve a favorable moldability from a liquid-crystalline epoxy resin that is crystallized during storage, by heating the same at a temperature higher than a temperature for molding. On the other hand, it is possible to achieve a favorable moldability of a glassy liquid-crystalline epoxy resin, without heating the same at a temperature higher than a temperature for molding. Therefore, improvement in productivity of epoxy resin products is expected as compared with a case in which conventional liquid-crystalline epoxy resins are used.

In the disclosure, the "liquid-crystalline epoxy resin" refers to an epoxy resin having a liquid-crystalline structure when it is in a cured state. The "glassy liquid-crystalline epoxy resin" refers to an epoxy resin that is in a glassy state and has a liquid-crystalline structure when it is in a glassy state. The "glassy state" refers to a solid but not in a crystallized (i.e., amorphous) state.

The glassy liquid-crystalline epoxy resin, obtained by the method as described above, has a liquid-crystalline structure in a glassy state. Therefore, the liquid-crystalline epoxy resin used in the method has a liquid-crystalline structure both in a cured state and in a glassy state before curing.

The liquid-crystalline structure of a glassy liquid-crystalline epoxy resin may be either a nematic structure or a smectic structure. From the viewpoint of moldability (fluidity), a nematic structure, that is closer to a liquid state than a smectic structure, is preferred.

The liquid-crystalline structure of a glassy liquid-crystalline epoxy resin that is in a cured state and the liquid-crystalline structure of a glassy liquid-crystalline epoxy resin that is in a glassy state may be the same or different from each other. From the viewpoint of toughness of a cured product, the liquid-crystalline structure of a glassy liquid-crystalline epoxy resin that is in a cured state is preferably a smectic structure. Therefore, a glassy liquid-crystalline epoxy resin may have a smectic structure when it is in a cured state and a nematic structure when it is in a glassy state.

Whether or not a liquid-crystalline epoxy resin has a liquid-crystalline structure, when it is in a cured or glassy state, can be determined by a method such as X-ray diffractometry or polarizing microscopy.

In the disclosure, a liquid-crystalline epoxy resin that is in a glassy state in which a crystal structure is partially formed is considered as a glassy liquid-crystalline epoxy resin, as long as the effect as mentioned above is achieved.

Whether or not a liquid-crystalline epoxy resin transitions into a glassy state can be determined by whether or not a liquid-crystalline epoxy resin has a glass transition point (Tg). The method for determining the existence of the Tg is not particularly limited, and can be performed by differential scanning calorimetry (DSC), for example.

The existence of the Tg can be determined by DSC to see whether or not an inflection point (step) appears on a heat flow curve during increasing or decreasing the temperature of a liquid-crystalline epoxy resin. When an inflection point appears on a heat flow curve, it is determined that a liquid-crystalline epoxy resin has a Tg at a temperature corresponding to the inflection point.

In a case in which a peak appears on a heat flow curve, it is determined that a phase transition that is not a transition into a glassy state, such as a transition from a crystalline phase into a liquid-crystalline phase (or from a liquid-crystalline phase into a crystalline phase), a transition from a liquid-crystalline phase into another liquid-crystalline phase, a transition from a liquid-crystalline phase into a liquid phase (or from a liquid phase into a liquid-crystalline phase), or the like is caused.

The inflection point may appear on a heat flow curve during either increasing or decreasing the temperature of a liquid-crystalline epoxy resin. From the viewpoint of moldability, the inflection point preferably appears on a heat flow curve at least during decreasing the temperature, more preferably on both a heat flow curve during increasing and a heat flow curve during decreasing the temperature.

Whether or not a liquid-crystalline epoxy resin that is in a glassy state has a crystal structure can be determined with a cross-Nicol polarizing microscope. It is also possible to determine by X-ray diffractometry as described below.

The liquid-crystalline epoxy resin used in the method as described above is not particularly limited, as long as it can transition into a glassy state that has a liquid-crystalline structure, upon cooling. For example, the liquid-crystalline epoxy resin may be a liquid-crystalline epoxy resin as described below.

The temperature at which the liquid-crystalline epoxy resin transitions into a glassy state (glass transition point, Tg) is not particularly limited. From the viewpoint of handling, the Tg is preferably 0° C. or higher, more preferably 5° C. or higher, further preferably 10° C. or higher. From the viewpoint of storage stability, the Tg is preferably 50° C. or less, more preferably 45° C. or less, further preferably 40° C. or less.

The conditions for cooling the liquid-crystalline epoxy resin during the cooling process is not particularly limited. The higher the cooling rate is, the more difficult it is to form a liquid-crystalline structure in a glassy liquid-crystalline epoxy resin. For example, the cooling rate is preferably 5° C./min or more, more preferably 10° C./min or more, further preferably 20° C./min or more. The cooling rate may be constant or varied during a period from the start to the completion of the cooling. The liquid-crystalline epoxy resin, which is prior to be subjected to the cooling process, may be in a liquid state or in a rubbery state (i.e., being solid at a temperature higher than the Tg).

<Production Method for Glassy Liquid-Crystalline Epoxy Resin Composition>

The production method for a glassy liquid-crystalline epoxy resin composition includes a process of cooling a liquid-crystalline epoxy resin composition, including a liquid-crystalline epoxy resin and a curing agent, to cause transition into a glassy state (cooling process).

In the disclosure, the "glassy liquid-crystalline epoxy resin composition" refers to an epoxy resin composition that is in a glassy state and has a liquid-crystalline structure in the glassy state.

For the details of the production method for a glassy liquid-crystalline epoxy resin composition, the details of the production method for a glassy liquid-crystalline epoxy resin may be referred to by replacing the "glassy liquid-crystalline epoxy resin" to the "glassy liquid-crystalline epoxy resin composition".

The curing agent included in the glassy liquid-crystalline epoxy resin composition is not particularly limited, and may be a curing agent included in a liquid-crystalline epoxy resin composition as described below. The glassy liquid-crystalline epoxy resin composition may include a component other than a curing agent, such as a filler. The component other than a curing agent is not particularly limited, and may be a component included in a liquid-crystalline epoxy resin composition as described below.

In the method as described above, a liquid-crystalline epoxy resin, included in a glassy liquid-crystalline epoxy resin composition, may be a liquid epoxy resin that is obtained by heating a glassy liquid-crystalline epoxy resin. Specifically, for example, a glassy liquid-crystalline epoxy resin composition may be obtained by melting a liquid-crystalline epoxy resin that is in a glassy state, mixing the melted liquid-crystalline epoxy resin with a curing agent to prepare a liquid-crystalline epoxy resin composition, and cooling the same to cause transition into a glassy state.

In that case, the glassy liquid-crystalline epoxy resin may be obtained either externally or internally.

<Storage Method for Liquid-Crystalline Epoxy Resin>

The storage method for a liquid-crystalline epoxy resin includes a process of cooling a liquid-crystalline epoxy resin to cause transition into a glassy state (cooling process).

In the process, a liquid-crystalline epoxy resin is cooled and stored in a glassy state having liquid crystallinity. The liquid-crystalline epoxy resin that is stored by the method tends to exhibit favorable moldability, as compared with a liquid-crystalline epoxy resin that is crystallized during storage. Further, a favorable moldability can be achieved without a need to heat for melting a crystallized liquid-crystalline epoxy resin.

As for the details for the liquid-crystalline epoxy resin and the cooling process, the details for the production method for a glassy liquid-crystalline epoxy resin or a liquid-crystalline epoxy resin as described below may be referred to.

The method for storing the glassy liquid-crystalline epoxy resin, after cooling the liquid-crystalline epoxy resin to cause transition into a glassy state, is not particularly limited. For example, the glassy liquid-crystalline epoxy resin is preferably stored at a temperature that is equal to or lower than the glass transition point of the liquid-crystalline epoxy resin. Once a liquid-crystalline epoxy resin becomes a glassy liquid-crystalline epoxy resin, the liquid-crystalline structure and the glassy state are maintained even if the glassy liquid-crystalline epoxy resin is stored at a temperature that is lower than the glass transition point thereof.

\<Storage Method for Liquid-Crystalline Epoxy Resin Composition\>

The storage method for a liquid-crystalline epoxy resin composition includes a process of cooling a liquid-crystalline epoxy resin composition, the composition including a liquid-crystalline epoxy resin and a curing agent, to cause transition into a glassy state (cooling process).

As for the details for the liquid-crystalline epoxy resin and the cooling process, the details for the production method for a glassy liquid-crystalline epoxy resin may be referred to. As for the details for the liquid-crystalline epoxy resin composition, the details for the liquid-crystalline epoxy resin composition as described below may be referred to.

The method for storing the glassy liquid-crystalline epoxy resin composition, after cooling the liquid-crystalline epoxy resin composition to cause transition into a glassy state, is not particularly limited. For example, the glassy liquid-crystalline epoxy resin composition is preferably stored at a temperature that is equal to or lower than the glass transition point of the liquid-crystalline epoxy resin composition. Once a liquid-crystalline epoxy resin composition becomes a glassy liquid-crystalline epoxy resin composition, the liquid-crystalline structure and the glassy state are maintained even if the glassy liquid-crystalline epoxy resin composition is stored at a temperature that is lower than the glass transition point thereof.

\<Glassy Liquid-Crystalline Epoxy Resin\>

The glassy liquid-crystalline epoxy resin has a liquid-crystalline structure.

The liquid-crystalline structure of the glassy liquid-crystalline epoxy resin may be either a nematic structure or a smectic structure. From the viewpoint of handling during molding (reducing viscosity), a nematic structure, which is closer to a liquid state than a smectic structure, is preferred.

The liquid-crystalline structure of a glassy liquid-crystalline epoxy resin that is in a cured state and the liquid-crystalline structure of a glassy liquid-crystalline epoxy resin that is in a glassy state may be the same or different from each other. From the viewpoint of toughness of a cured product, the liquid-crystalline structure of a glassy liquid-crystalline epoxy resin that is in a cured state is preferably a smectic structure. Therefore, a glassy liquid-crystalline epoxy resin may have a smectic structure when it is in a cured state and a nematic structure when it is in a glassy state.

In the disclosure, a liquid-crystalline epoxy resin that is in a glassy state in which a crystal structure is partially formed is considered as a glassy liquid-crystalline epoxy resin, as long as the effect as mentioned above is achieved.

Whether or not a glassy liquid-crystalline epoxy resin is in a glassy state can be determined by whether or not the glassy liquid-crystalline epoxy resin has a glass transition point (Tg). The method for determining the existence of the Tg is not particularly limited, and may be performed by DSC as described above, for example.

Whether or not a glassy liquid-crystalline epoxy resin has a crystalline structure can be determined with a cross-Nicol polarized microscope, or by performing X-ray diffractometry.

The glassy liquid-crystal epoxy resin may be a product obtained by cooling a liquid-crystalline epoxy resin, by the production method for the glassy liquid-crystalline epoxy resin as described above. In that case, the liquid-crystalline epoxy resin, as described below, may be used as the liquid-crystalline epoxy resin.

\<Glassy Liquid-Crystal Epoxy Resin Composition\>

The glassy liquid-crystalline epoxy resin composition includes a liquid-crystalline epoxy resin and a curing agent, and has a liquid-crystalline structure.

As for the details for the glassy liquid-crystalline epoxy resin composition, the details for the glassy liquid-crystal epoxy resin may be referred to by replacing the "glassy liquid-crystal epoxy resin" to the "glassy liquid-crystal epoxy resin composition".

The glassy liquid-crystal epoxy resin composition may include the liquid-crystalline epoxy resin as described below, as the liquid-crystalline epoxy resin. As necessary, the glassy liquid-crystal epoxy resin composition may include other components such as a filler and a curing accelerator. As for the details for the other components, the details in the glassy liquid-crystalline epoxy resin composition as described below may be referred to.

\<Liquid-Crystalline Epoxy Resin\>

The liquid-crystalline epoxy resin is capable of transitioning into a glassy state.

Whether or not a liquid-crystalline epoxy resin is capable of transitioning into a glassy state can be determined by whether or not the liquid-crystalline epoxy resin has a glass transition point (Tg). Whether or not a liquid-crystalline epoxy resin has a Tg can be determined by whether or not an inflection point appears on a heat flow curve obtained by DSC, for example. As for the details of the DSC, the details as described in the production method for a glassy liquid-crystalline epoxy resin as described above may be referred to.

The liquid-crystalline epoxy resin may have an inflection on a heat flow curve obtained by DSC.

The liquid-crystalline epoxy resin has a liquid crystal structure upon transition into a glassy state. The liquid crystal structure of the liquid-crystalline epoxy resin that has transitioned into a glassy state may be either a nematic structure or a smectic structure. From the viewpoint of handleability during molding (lowering the viscosity), a nematic structure, which is closer to a liquid state, is preferred.

The liquid-crystalline structure of a liquid-crystalline epoxy resin that is in a cured state and the liquid-crystalline structure of the liquid-crystalline epoxy resin that is in a glassy state may be the same or different from each other. From the viewpoint of toughness of a cured product, the liquid-crystalline structure of a liquid-crystalline epoxy resin that is in a cured state is preferably a smectic structure. Therefore, a liquid-crystalline epoxy resin may have a smectic structure when it is in a cured state and a nematic structure when it is in a glassy state. From the viewpoint of moldability, the liquid-crystalline structure in a glassy state (before being cured) is preferably a nematic structure.

Whether or not a liquid-crystalline epoxy resin has a liquid-crystalline structure when it is in a cured or glassy state can be determined by a method such as X-ray diffractometry or polarizing microscopy.

In the disclosure, a liquid-crystalline epoxy resin that is in a glassy state in which a crystal structure is partially formed is considered as a glassy liquid-crystalline epoxy resin, as long as the effect as mentioned above is achieved.

The liquid-crystalline epoxy resin may have a property of transitioning into a glassy state upon cooling. As for the conditions for cooling, details of the conditions for cooling as described in the production method for a glassy liquid-crystalline epoxy resin may be referred to.

Examples of the liquid-crystalline epoxy resin include a liquid-crystalline epoxy resin including a liquid-crystalline epoxy compound having a mesogenic structure in its molecule. The liquid-crystalline epoxy compound having a mesogenic structure in its molecule, included in the liquid-crystalline epoxy resin, may be a single kind or two or more kinds having different molecular structures. The liquid-crystalline resin may include an epoxy compound that is not a liquid-crystalline epoxy compound, as long as the effect as mentioned above can be achieved.

Examples of the mesogenic structure include a biphenyl structure, a terphenyl structure, a structure similar to a terphenyl structure, an anthrathene structure, a phenyl benzoate structure, a cyclohexyl benzoate structure, an azobenzene structure, a stilbene structure, derivatives of these structures, and a structure in which two or more of these structures are linked via a linking group. An epoxy compound having a mesogenic structure has a property of forming a higher-order structure in a cured product obtained therefrom.

In the disclosure, the "higher-order structure" refers to a state that molecules of epoxy compounds are aligned and oriented in a resin matrix (a portion derived from an epoxy resin and a curing agent, excluding a filler or the like). For example, the higher-order structure refers to a state that a crystalline structure or a liquid-crystalline structure exists in a resin matrix.

The existence of a crystalline structure or a liquid-crystalline structure can be directly determined by, for example, a cross-Nicole polarizing microscopy or X-ray diffractometry. Alternatively, the existence of a crystalline structure or a liquid-crystalline structure can be determined in an indirect manner by measuring a change in storage elastic modulus with respect to a temperature. A crystalline structure or a liquid-crystalline structure in a resin functions to reduce a change in storage elastic modulus with respect to a temperature of the resin.

Examples of the higher-order structure with a high degree of regularity, which is derived from a mesogenic structure, include a nematic structure and a smectic structure. The nematic structure is a liquid-crystalline structure in which the long axis of molecules are oriented in a uniform direction. The smectic structure is a liquid-crystalline structure having a unidimensional order and a layered structure with a constant period, in addition to an orientational order. In a smectic structure, domains are formed from the same periodical structures.

Whether or not a periodical structure in a resin matrix includes a smectic structure can be determined by, for example, performing X-ray diffractometry, using a CuKα1 line under a tube voltage of 40 kV, a tube current of 20 mA, and a measurement range of 2θ=0.5° to 30°, to determine whether or not a diffraction peak appears in a range of 2θ=1° to 10°. When a diffraction peak exists, it is determined that the periodical structure in the resin matrix includes a smectic structure. The measurement can be performed by using an X-ray diffractometer (Rigaku Corporation, for example).

When the periodical structure in the resin matrix includes a smectic structure, from the viewpoint of thermal conductivity, the proportion of the periodical structure including a smectic structure is preferably 60% by volume or more, more preferably 80% by volume or more, of a total resin matrix.

The proportion of the periodical structure including a smectic structure with respect to the total resin matrix can be measured in a simple manner by, for example, preparing a sample in a thickness of 50 μm from a cured product of the resin matrix and observing the same with a polarizing microscope (for example, OPTIPHOT2-POL from Nikon Corporation) to measure the area of the periodical structure including a smectic structure, and calculate the proportion of the periodical structure including a smectic structure.

The resin matrix preferably includes a periodical structure having a period length of from 2.0 nm to less than 4.0 nm. By including a periodical structure having a period length of from 2.0 nm to less than 4.0 nm, a higher degree of regularity in the resin matrix is obtained and a higher degree of toughness can be achieved.

The length of a period in the periodical structure can be calculated from the Bragg's formula as described below, by performing X-ray diffractometry under the following conditions with a wide angle X-ray diffractometer (for example, RINT2500HL from Rigaku Corporation).

(Measurement Conditions)
X-ray source: Cu
X-ray output: 50 kV, 250 mA
Divergence slit (DS): 1.0°
Scattering slit (SS): 1.0°
Receiving slit (RS): 0.3 mm
Scan rate: 1.0°/min
Bragg's formula: 2d sin=θλ

In the formula, d refers to a length of a period, θ refers to a diffraction angel, n refers to a reflection order, and λ refers to an X-ray wavelength (0.15406 nm).

The type of the liquid-crystalline epoxy compound is not particularly limited. A liquid-crystalline epoxy resin including a liquid-crystalline epoxy compound, having a greater molecular size, tends to be easier to transition into a glassy state. Accordingly, for example, the molecular size of the liquid-crystalline epoxy compound is preferably 300 or more, more preferably 400 or more, further preferably 500 or more. From the viewpoint of viscosity, the molecular size of the liquid-crystalline epoxy compound is preferably 10,000 or less, more preferably 7,500 or less, further preferably 5,000 or less.

A cured product including a resin matrix in which a smectic structure is formed tends to exhibit a superior fracture toughness, as compared with a cured product including a resin matrix in which a nematic structure is formed, since the domains formed from a smectic structure function to disperse a stress. Therefore, from the viewpoint of improving fracture toughness, a liquid-crystalline epoxy compound that forms a smectic structure in a cured state is preferred.

Examples of a liquid-crystalline epoxy compound that forms a smectic structure in a cured state include a liquid-crystalline epoxy compound represented by the following Formula (I). A single kind of the liquid-crystalline epoxy compound represented by Formula (I) may be used alone or in combination of two or more kinds.

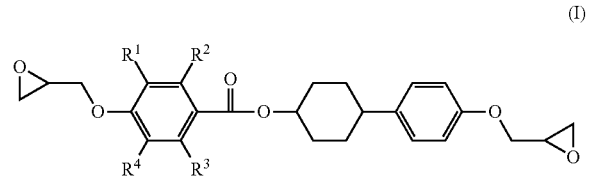

(I)

In Formula (I), each of $R^1$ to $R^4$ independently represents a hydrogen atom or an alkyl group having from 1 to 3 carbon atoms. Each of $R^1$ to $R^4$ is preferably a hydrogen atom or an alkyl group having 1 or 2 carbon atoms, more preferably a hydrogen atom or a methyl group, further preferably a hydrogen atom. The number of hydrogen atoms represented by $R^1$ to $R^4$ is preferably from 2 to 4, more preferably 3 or 4, further preferably 4. When any one of $R^1$ to $R^4$ is an alkyl group having from 1 to 3 carbon atoms, the alkyl group is preferably at least one of $R^1$ or $R^4$.

The liquid-crystalline epoxy compound represented by Formula (I) is preferably at least one selected from the group consisting of 4-{4-(2,3-epoxypropoxy)phenyl}cyclohexyl= 4-(2,3-epoxypropoxy)benzoate and 4-{4-(2,3-epoxypropoxy)phenyl}cyclohexyl=4-(2,3-epoxypropoxy)-3-methylbenzoate. Details of the liquid-crystalline epoxy compound represented by Formula (I) are described in Japanese Patent Application Laid-Open No. 2011-74366, for example.

In an embodiment, the liquid-crystalline epoxy resin includes a multimer of a liquid-crystalline epoxy compound. A liquid-crystalline epoxy compound having a mesogenic structure in its molecule tends to be crystallized, as compared with other epoxy compounds. By using a liquid-crystalline epoxy compound in the form of a multimer with an increased molecular size, the liquid-crystalline epoxy resin becomes more difficult to crystallize and more likely to cause transition into a glassy state upon cooling.

When the liquid-crystalline epoxy resin includes a liquid-crystalline epoxy compound in the form of a multimer, the liquid-crystalline epoxy resin may include only the multimer, or may include a liquid-crystalline epoxy compound that is not a multimer in combination. From the viewpoint of handling, the liquid-crystalline epoxy resin preferably includes both a liquid-crystalline epoxy compound that is not in the form of a multimer and a liquid-crystalline epoxy compound that is in the form of a multimer.

Examples of a multimer of the liquid-crystalline epoxy compound include a reaction product of two or more liquid-crystalline epoxy compounds, which may be the same kind or different from each other, and a compound having two or more functional groups that can react with an epoxy group.

In the disclosure, a liquid-crystalline epoxy resin, including a reaction product of two or more liquid-crystalline epoxy compounds and a compound having two or more functional groups that can react with an epoxy group, is also referred to as a "prepolymer", and a compound having two or more functional groups that can react with an epoxy group is also referred to as a "prepolymerization agent".

The kind of the prepolymerization agent is not particularly limited. The prepolymerization agent is preferably a compound having two or more hydroxy groups or amino groups, more preferably a compound having two or more hydroxy groups. A single kind of the prepolymerization agent may be used alone or two or more kinds may be used in combination.

From the viewpoint of forming a smectic structure in a cured product, the prepolymerization agent is preferably at least one selected from the group consisting of a dihydroxybenzene compound, having a structure in which two hydroxy groups are bound to one benzene ring; a diaminobenzene compound, having a structure in which two amino groups are bound to one benzene ring; a dihydroxybiphenyl compound, having a structure in which a hydroxy group is bound to each of the two benzene rings that form a biphenyl structure; and a diaminobiphenyl compound, having a structure in which an amino group is bound to each of the two benzene rings that form a biphenyl structure.

Examples of the dihydroxybenzene compound include 1,2-dihydroxybenzene (catechol), 1,3-dihydroxybenzene (resorcinol), 1,4-dihydroxybenzene (hydroquinone) and derivatives of these compounds.

Examples of the diaminobenzene compound include 1,2-diaminobenzene, 1,3-diaminobenzene, 1,4-diaminobenzene and derivatives of these compounds.

Examples of the dihydroxybiphenyl compound include 3,3'-dihydroxybiphenyl, 3,4'-dihydroxybiphenyl, 4,4'-dihydroxybiphenyl and derivatives of these compounds.

Examples of the diaminobiphenyl compound include 3,3'-diaminobiphenyl, 3,4'-diaminobiphenyl, 4,4'-diaminobiphenyl and derivatives of these compounds.

Derivatives of the compounds as described above include a compound having a substitute, such as an alkyl group of from 1 to 8 carbon atoms, on the benzene ring.

From the viewpoint of forming a smectic structure in a cured product of the epoxy resin, the prepolymerization agent is preferably 1,4-dihydroxybenzene, 1,4-diaminobenzene, 4,4'-dihydroxybiphenyl or 4,4'-diaminobiphenyl. Since the compounds have the hydroxy groups or the amino groups at a para position with respect to each other, the multimer obtained by reacting the compound with a liquid-crystalline epoxy compound tends to have a straight structure. Therefore, a smectic structure tends to be formed in a cured product due to a high degree of stacking of the molecules.

Examples of the reaction product of the liquid-crystalline epoxy compound and a prepolymerization agent include the liquid-crystalline epoxy compounds having a structure represented by the following Formulae (II-A) to (II-D).

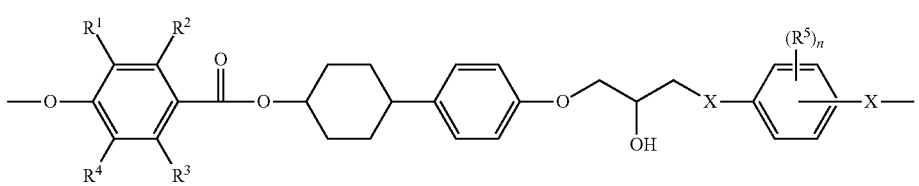

(II-A)

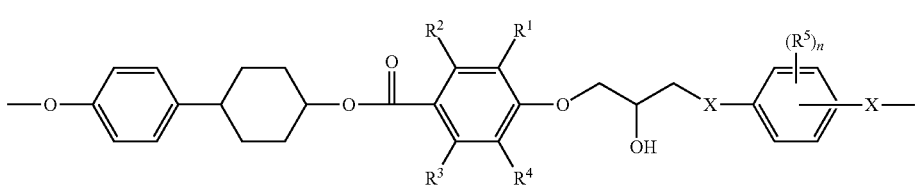

(II-B)

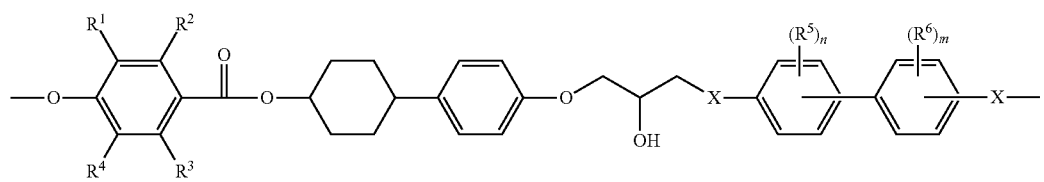
(II-C)

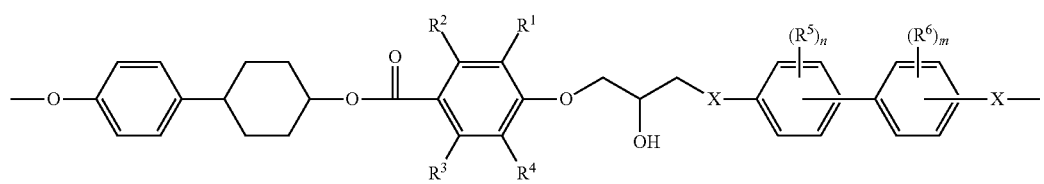
(II-D)

In Formulae (II-A) to (II-D), each of $R^1$ to $R^4$ independently represents a hydrogen atom or an alkyl group having from 1 to 3 carbon atoms, each of $R^5$ and $R^6$ independently represents an alkyl group having from 1 to 8 carbon atoms, each of n and m independently represents an integer from 0 to 4, and each of X independently represents —O— or —NH—. The preferred embodiments of $R^1$ to $R^4$ are the same as the preferred embodiments of $R^1$ to $R^4$ in Formula (I).

Examples of a reaction product obtained from two liquid-crystalline epoxy compounds and one prepolymerization agent (dimer) include the liquid-crystalline epoxy compounds represented by the following Formulae (III-A) to (III-F).

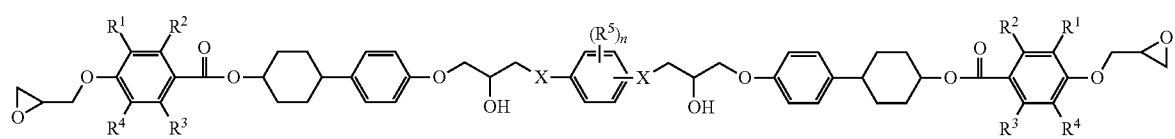
(III-A)

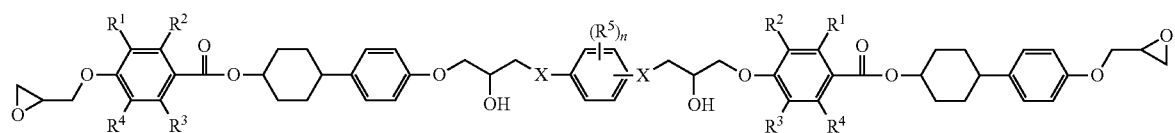
(III-B)

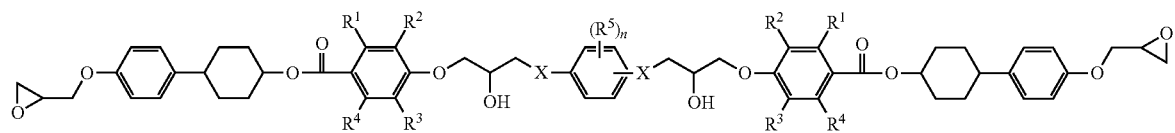
(III-C)

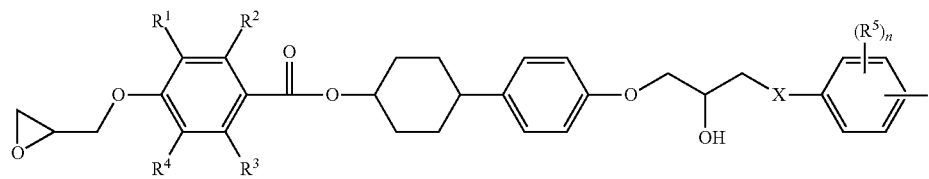
(III-D)

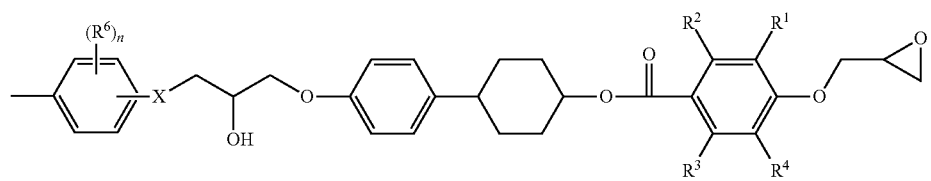

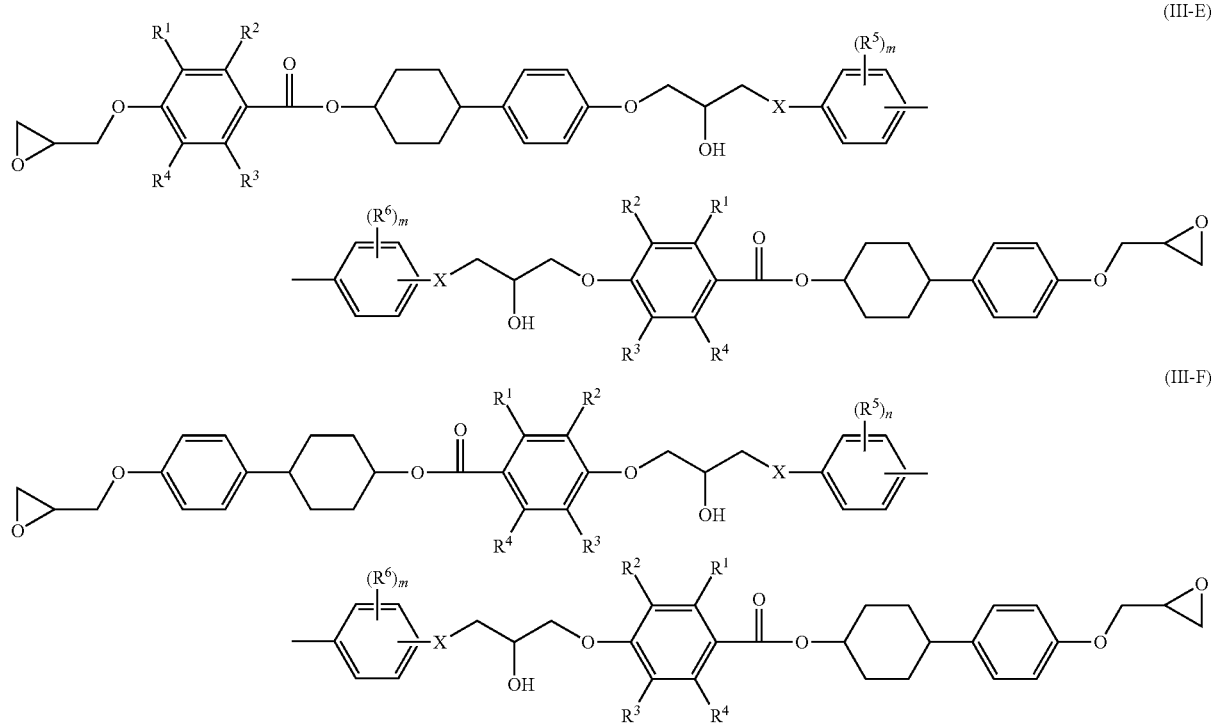

Definitions and preferred ranges of $R^1$ to $R^6$, n, m and X in Formulae (III-A) to (III-F) are the same as the definitions and the preferred ranges of $R^1$ to $R^6$, n, m and X in Formulae (II-A) to (II-D).

The epoxy compound having a structure represented by Formulae (II-A) to (II-D) and an epoxy compound having a structure represented by Formulae (III-A) to (III-F) can be obtained by, for example, allowing a liquid-crystalline epoxy compound represented by Formula (I) with a prepolymerization agent.

The method for obtaining a liquid-crystalline epoxy resin in the form of a prepolymer is not particularly limited. For example, the liquid-crystalline epoxy compound can be obtained by preparing a mixture including a liquid-crystalline epoxy compound and a prepolymerization agent, and optionally other components such as a reaction solvent and a reaction catalyst, and causing the reaction thereof.

The proportion of the reaction product of a liquid-crystalline epoxy compound and a prepolymerization agent, and the unreacted liquid-crystalline epoxy compound, in the prepolymer can be regulated by the mixing ratio of the liquid-crystalline epoxy compound and the prepolymerization agent used for the reaction, the reaction conditions, and the like.

The mixing ratio of the liquid-crystalline epoxy compound and the prepolymerization agent may be, for example, determined such that the number of epoxy groups of the total liquid-crystalline epoxy compound and the functional groups of the total prepolymerization agent (epoxy group/functional group) is from 100/10 to 100/30.

<Liquid-Crystalline Epoxy Resin Composition>

The liquid-crystalline epoxy resin composition of the invention includes a liquid-crystalline epoxy resin and a curing agent, and is capable of transitioning into a glassy state.

As for the details of the liquid-crystalline epoxy resin composition of the disclosure, the details of the liquid-crystalline epoxy resin as described above may be referred to by replacing the "liquid-crystalline epoxy resin" to the "liquid-crystalline epoxy resin composition".

The liquid-crystalline epoxy resin composition may further include a component such as a filler or a curing accelerator, as necessary. The liquid-crystalline epoxy resin may be the liquid-crystalline epoxy resin of the disclosure as described above.

From the viewpoint of moldability, the content of the liquid-crystalline epoxy resin is preferably from 5% by volume to 40% by volume, more preferably from 10% by volume to 35% by volume, further preferably 15% by volume to 35% by volume, yet further preferably from 15% by volume to 30% by volume, with respect to the total solid content of the liquid-crystalline epoxy resin composition.

In the disclosure, the content of the liquid-crystalline epoxy compound with respect to the total solid content of the liquid-crystalline epoxy resin composition is calculated by the following formula.

Content of liquid-crystalline epoxy resin with respect to total solid content of liquid-crystalline epoxy resin composition (% by volume)=$\{(Aw/Ad)/((Aw/Ad)+(Bw/Bd)+(Cw/Cd)\}\times 100$ The details of the variables in the formula are as follows.

Aw: Mass composition ratio of liquid-crystalline epoxy resin (% by mass)
Bw: Mass composition ratio of curing agent (% by mass)
Cw: Mass composition ratio of other components (except solvent) (% by mass)
Ad: Specific gravity of liquid-crystalline epoxy resin
Bd: Specific gravity of curing agent
Cd: Specific gravity of other components (except solvent)

(Curing Agent)

The curing agent included in the liquid-crystalline epoxy resin composition is not particularly limited, as long as it is capable of causing a curing reaction with the liquid-crystalline epoxy resin. Specific examples of the curing agent include an amine curing agent, an acid anhydride curing agent, a phenol curing agent, a polymercaptan curing agent, a polyaminoamide curing agent, an isocyanate curing agent, and a block isocyanate curing agent. A single kind of the curing agent may be used alone, or two or more kinds may be used in combination.

From the viewpoint of forming a higher-order structure in a cured product of the liquid-crystalline epoxy resin composition, the curing agent is preferably an amine curing agent or a phenol curing agent, more preferably an amine curing agent.

Examples of the amine curing agent include a chain aliphatic polyamine, a cyclic aliphatic polyamine, an aliphatic aromatic amine and an aromatic amine. From the viewpoint of forming a higher-order structure, an aromatic amine is preferred. Examples of the aromatic amine include m-phenylenediamine, diaminodiphenylmethane, diaminonaphthalene and diamino diphenyl sulfone. From the viewpoint of forming a higher-order structure, diaminodiphenyl sulfone is preferred. From the viewpoint of improving fracture toughness, 3,3'-diaminodiphenyl sulfone is more preferred.

The content of the curing agent in the liquid-crystalline epoxy resin composition is not particularly limited, and may be determined in view of the type of the curing agent, properties of the liquid-crystalline epoxy resin, and the like.

Specifically, for example, the amount of the curing agent is preferably determined such that the functional groups of the total curing agent (active hydrogens in the case of amine curing agent) with respect to the epoxy groups of the total liquid-crystalline epoxy resin (functional group/epoxy group) is from 0.005 to 5, more preferably from 0.01 to 3, further preferably from 0.5 to 1.5.

When the ratio of the functional groups of the total curing agent with respect to the epoxy groups of the total liquid-crystalline epoxy resin is 0.005 or more, the rate of curing of the liquid-crystalline epoxy resin tends to improve. When the ratio of the functional groups of the total curing agent with respect to the epoxy groups of the total liquid-crystalline epoxy resin is 5 or less, the curing reaction tends to be regulated in a more favorable manner.

(Filler)

The liquid-crystalline epoxy resin composition may include a filler.

In view of the strength and toughness, carbon fiber, ceramic fiber, rubber fiber, carbon particles, ceramic particles, rubber particles and the like may be used as a filler.

The content of the filler is preferably 10% by mass or more, more preferably from 20% by mass to 90% by mass, more preferably from 30% by mass to 80% by mass, with respect to the total solid content of the liquid-crystalline epoxy resin composition.

(Other Epoxy Compounds)

The liquid-crystalline epoxy resin composition may include an epoxy compound other than the liquid-crystalline epoxy compound.

Examples of the other epoxy compounds include a glycidyl ether of a phenol compound such as bisphenol A, bisphenol F, bisphenol S, phenol novolac, cresol novolac and resorcinol novolac; a glycidyl ether of an alcohol compound such as butanediol, polyethylene glycol and polypropylene glycol; a glycidyl ester of a carboxylic acid compound such as phthalic acid, isophthalic acid and tetrahydrophthalic acid; a compound obtained by substituting an active hydrogen bound to a nitrogen atom of aniline, isocyanuric acid and the like; an alicyclic epoxy compound obtained by epoxidizing an olefin bond in the molecule, such as vinylcyclohexene epoxide, 3,4-epoxycyclohexylmethyl-3,4-epoxycyclohexanecarboxylate, 2-(3,4-epoxy)cyclohexyl-5,5-spiro(3,4-epoxy)cyclonexane-m-dioxane; an epoxidized compound of bis(4-hydroxy)thioether; a glycidyl ether of a phenol resin that is modified by p-xylylene, m-xylylene and p-xylylene, terpene, dicylclopentadiene, cyclopentadiene, polyaromatic rings and naphthalene; a stilbene epoxy compound, and a halogenated phenol novolac epoxy compound (an epoxy compound corresponding to a liquid-crystalline epoxy compound is excluded therefrom).

A single kind of an epoxy compound other than a liquid-crystalline epoxy compound may be used alone, or two or more kinds may be used in combination.

When the liquid-crystal epoxy resin composition includes an epoxy compound other than the liquid-crystalline epoxy compound, the content thereof is not particularly limited. For example, the amount of the epoxy compound other than the liquid-crystalline epoxy compound is preferably 0.3 or less by mass, more preferably 0.2 or less by mass, further preferably 0.1 or less by mass, when the amount of the liquid-crystal epoxy compound is given as 1.

(Other Components)

The epoxy resin composition may further include a curing accelerator, a sizing agent, a coupling agent, a dispersant, an elastomer, a solvent and the like, as necessary. When the epoxy resin composition include a solvent, from the viewpoint of forming a smectic structure in a cured product, the content of the solvent is preferably smaller. Specifically, for example, the content of the solvent in the total epoxy resin composition is preferably 10% by mass or less, more preferably 1% by mass or less, further preferably 0.1% by mass or less.

<Production Method for Cured Epoxy Resin>

The production method for a cured liquid-crystalline epoxy resin includes a process of heating the glassy liquid-crystalline epoxy resin or the glassy liquid-crystalline epoxy resin composition, as described above, at a temperature at which a curing reaction of the glassy liquid-crystalline epoxy resin or the glassy liquid-crystalline epoxy resin composition is caused (curing process).

In the method, an epoxy resin or an epoxy resin composition that is in a glassy state before curing is used. Therefore, handleability during molding is more favorable than in a method in which an epoxy resin or an epoxy resin composition that is in a crystallized state before curing is used. As a result, the cured liquid-crystalline epoxy resin obtained by the method tends to exhibit excellent properties such as fracture toughness.

Further, since it is not necessary to melt a crystallized structure of the epoxy resin by heating before the curing process, productivity of the cured epoxy resin is expected. Accordingly, the method may be a method that does not include a process of heating the epoxy resin to melt a crystallized state of the epoxy resin.

In the production method as described above, it is not necessary to perform a heating process for melting a liquid-crystalline structure of an epoxy resin that has crystallized, prior to the curing process. Therefore, improvement in productivity of a cured epoxy resin composition can be expected. Accordingly, the production method may be a method that does not include a heating process for melting a liquid-crystalline structure of the epoxy resin prior to the curing process.

The method may further include a process of molding the glassy liquid-crystalline epoxy resin or the glassy liquid-crystalline epoxy resin composition (molding process) prior to the curing process.

The molding process may be performed by, for example, heating the glassy liquid-crystalline epoxy resin or the glassy liquid-crystalline epoxy resin composition, at a temperature of at least the Tg thereof, to be in a moldable state. The method for molding is not particularly limited, and may be performed by an ordinary method for molding a liquid-crystalline epoxy resin.

The cured epoxy resin produced by the production method may be used in various applications. For example, the cured epoxy resin is suitably used as a packaging material for electric or electronic devices, sports products, bodies of automobiles, trains or airplanes, and building materials.

The cured epoxy resin produced by the production method may be used as a composite material including the cured epoxy resin and a reinforcing material.

The reinforcing material is not particularly limited, and may be selected depending on the applications of the composite materials. Specific examples include glass, aromatic polyamide resin (such as Kevlar (registered trademark)), ultrahigh molecular weight polyethylene, alumina, boron nitride, aluminum nitride, mica and silicon. The shape of the reinforcing material is not particularly limited, and may be in the form of fibers, particles (filler) or the like. A single kind of the reinforcing material may be used alone or in combination of two or more kinds.

The configuration of the composite material is not particularly limited. For example, the composite material may have at least one cured product-containing layer, which includes a cured epoxy resin, and at least one reinforcing material-containing layer, which includes a reinforcing material. In that case, the curing product-containing layer may include a reinforcing material, or the reinforcing material-containing layer may include a cured epoxy resin.

EXAMPLES

In the following, the embodiments as described above are explained by referring to the Examples. However, the embodiments are not limited to the Examples.

Example 1

(Preparation of liquid-crystalline epoxy resin)

An epoxy compound that exhibits liquid-crystallinity, 4-{4-(2,3-epoxypropoxy)phenyl}cyclohexyl=4-(2,3-epoxypropoxy)benzoate, represented by Formula (I) hereinafter referred to as Epoxy Compound 1, and 4,4'-biphenol as a prepolymerization agent were allowed to react at a molar ratio (Epoxy Compound 1/prepolymerization agent) of 10/2.5, and a liquid-crystalline epoxy resin in the form of a prepolymer (hereinafter referred to as Resin 1) was prepared.

(Evaluation of Glass Transition Behavior)

The glass-transition behavior of Resin 1 was evaluated by performing DSC. Specifically, Resin 1, which had been heated to a temperature of 180° C., was cooled to −20° C. at a cooling rate of 1° C./min, 5° C./min, 10° C./min or 200° C./min. Then, Resin 1 was heated from −20° C. to 180° C. at a rate of 10° C./min, thereby obtaining heat flow curves.

The glass transition behavior was evaluated by the existence of an inflection point on the heat flow curves. The results are evaluated based on the following criteria, and are shown in Table 1.

A: An inflection point appears on at least one of a heat flow curve during decreasing the temperature or on a heat flow curve during increasing the temperature.

B: An inflection point does not appear on both heat flow curves.

The obtained heat flow curves are shown in graphs (a) to (d) in FIG. 1. In each of the graphs, an inflection point was observed at least one of a heat flow curve during decreasing the temperature or on a heat flow curve during increasing the temperature.

(Phase Structure)

The phase structure of Resin 1 at −20° C. was observed with a cross-Nicol polarizing microscope. The results are shown in Table 1.

(Preparation of Epoxy Resin Composition)

An epoxy resin composition was prepared by adding a curing agent (3,3'-diaminodiphenyl sulfone) to Resin 1 (cooled to −20° C. at a rate of 200° C./min and heated from −20° C. to 180° C.). The amount of the curing agent was adjusted such that the ratio of the number of epoxy groups of Resin 1 and active hydrogens of the curing agent was 1:1. The epoxy resin composition was heated at 180° C. for 2 hours, thereby obtaining a cured product.

(Moldability)

The epoxy resin composition, which was heated at 80° C., was applied onto a substrate by coating, without using a solvent. The moldabiltiy was evaluated by the following criteria and the results are shown in Table 1.

A: Coating could be performed at least 8 times out of 10 times.

B: Coating could be performed 6 or 7 times out of 10 times.

C: Coating could be performed from 1 to 5 times out of 10 times.

D: Coating could not be performed without a solvent.

(Fracture Toughness)

A sample having a size of 3.75 mm×7.5 mm×33 mm for evaluation of fracture toughness was prepared from the cured product of the epoxy resin composition. By using the sample, fracture toughness (MPa·m$^{1/2}$) was evaluated by a three-point bending test based on ASTM D5045. The test was performed with a tester (Instron 5948 from Instron). The results are shown in Table 1.

(Existence of Smectic Structure and Period Length)

The existence or non-existence of a smectic structure and the period length of a cured product of the epoxy resin composition were evaluated by the method as mentioned above. The results are shown in Table 1.

Example 2

An epoxy resin composition was prepared in the same manner as Example 1, except that Resin 1 (cooled to −20° C. at a rate of 10° C./min and heated from −20° C. to 180° C.) was used, and a cured product of the epoxy resin composition was obtained.

The results of evaluating the glass transition behavior and the phase structure at −20° C. of Resin 1, and the moldability, the fracture toughness, the existence or non-existence of a smectic structure and the period length of the cured product are shown in Table 1.

Example 3

An epoxy resin composition was prepared in the same manner as Example 1, except that Resin 1 (cooled to −20°

C. at a rate of 5° C./min and heated from −20° C. to 180° C.) was used, and a cured product of the epoxy resin composition was obtained.

The results of evaluating the glass transition behavior and the phase structure at −20° C. of Resin 1, and the moldability, the fracture toughness, the existence or non-existence of a smectic structure and the period length of the cured product are shown in Table 1.

Example 4

An epoxy resin composition was prepared in the same manner as Example 1, except that Resin 1 (cooled to −20° C. at a rate of 1° C./min and heated from −20° C. to 180° C.) was used, and a cured product of the epoxy resin composition was obtained.

The results of evaluating the glass transition behavior and the phase structure at −20° C. of Resin 1, and the moldability, the fracture toughness, the existence or non-existence of a smectic structure and the period length of the cured product are shown in Table 1.

Example 5

An epoxy resin composition was prepared in the same manner as Example 1, except that Resin 2 (cooled to −20° C. at a rate of 10° C./min and heated from −20° C. to 180° C.) was used, and a cured product of the epoxy resin composition was obtained.

Resin 2 as mentioned above is an epoxy resin that exhibits liquid-crystallinity, 1-(3-methyl-4-oxiranylmethoxyphenyl)-4-(oxiranylmethoxyphenyl)-1-cyclohexene.

The results of evaluating the glass transition behavior and the phase structure at −20° C. of Resin 2, and the moldability, the fracture toughness, the existence or non-existence of a smectic structure and the period length of the cured product are shown in Table 1.

Comparative Example 1

An epoxy resin composition was prepared in the same manner as Example 1, except that Resin 3 (cooled to −20° C. at a rate of 200° C./min and heated from −20° C. to 180° C.) was used, and a cured product of the epoxy resin composition was obtained.

Resin 3 as mentioned above is Epoxy Compound 1 without being subjected to reaction with a prepolymerization agent.

The results of evaluating the glass transition behavior and the phase structure at −20° C. of Resin 3, and the moldability, the fracture toughness, the existence or non-existence of a smectic structure and the period length of the cured product are shown in Table 1.

Comparative Example 2

An epoxy resin composition was prepared in the same manner as Example 1, except that Resin 4 (cooled to −20° C. at a rate of 200° C./min and heated from −20° C. to 180° C.) was used, and a cured product of the epoxy resin composition was obtained.

Resin 4 as mentioned above is a bisphenol A epoxy resin that does not exhibit liquid-crystallinity, jER828 from Mitsubishi Chemical Corporation.

The results of evaluating the phase structure at −20° C. of Resin 4, and the moldability, the fracture toughness, the existence or non-existence of a smectic structure and the period length of the cured product are shown in Table 1. Since Resin 4 does not exhibit liquid-crystallinity, the evaluation by DSC was not performed.

Comparative Example 3

An epoxy resin composition was prepared in the same manner as Comparative Example 2, except that the cooling rate of Resin 4 was changed to 10° C./min, and a cured product of the epoxy resin composition was obtained.

The results of evaluating the phase structure at −20° C. of Resin 4, and the moldability, the fracture toughness, the existence or non-existence of a smectic structure and the period length of the cured product are shown in Table 1.

TABLE 1

|  | Liquid crystallinity | Cooling rate (°/min) | Glass transition behavior | Phase structure (−20°) | Moldability | Fracture toughness (MPa·m$^{1/2}$) | Period length (nm) | Smectic structure in cured product |
|---|---|---|---|---|---|---|---|---|
| Example 1 | Yes | 200 | A | Nematic | A | 1.8 | 2.7 | Yes |
| Example 2 | Yes | 10 | A | Nematic | A | 1.8 | 2.7 | Yes |
| Example 3 | Yes | 5 | A | Nematic | A | 1.8 | 2.7 | Yes |
| Example 4 | Yes | 1 | A | Nematic' | B | 1.7 | 2.7 | Yes |
| Example 5 | Yes | 10 | A | Smectic | C | 1.6 | 2.7 | Yes |
| Comparative Example 1 | Yes | 200 | B | Crystalline | D | 1.4 | 2.2 | Yes |
| Comparative Example 2 | No | 200 | — | Isotropic | A | 0.7 | — | No |
| Comparative Example 3 | No | 10 | — | Isotropic | A | 0.7 | — | No |

In Table 1, the hyphen in the column indicates that the evaluation was not performed. The hyphen in the column regarding the period length indicates that a periodic structure is not formed. The "Nematic" attached with an apostrophe indicates a state with a degree of order that is higher than that of an ordinary nematic structure but lower than that of an ordinary smectic structure, or a state in which a nematic structure and a smectic structure are mixed.

As shown in Table 1, the epoxy resin composition of the Examples, in which the glass transition behavior was observed upon cooling, exhibited excellent moldability. In addition, the cured product obtained in the Examples exhibited excellent fracture toughness, and the reason for this is considered to be a favorable moldability of the epoxy resin composition.

Among the Examples, Examples 1 to 3, in which a nematic structure was observed in a glassy state, exhibited better results in moldability than Examples 4 and 5 and the fracture toughness was also favorable.

Comparative Example 1, in which the epoxy compound was not reacted with a prepolymerization agent, became crystallized upon cooling, rather than transitioning into a glassy state, and showed the inferior results to the Examples in the moldabiltiy and the fracture toughness.

Comparative Example 2 and Comparative Example 3, in which an epoxy compound that does not exhibit liquid-crystallinity, showed excellent moldability but significantly poor fracture toughness of the cured product.

The invention claimed is:

1. A production method for a glassy liquid-crystalline epoxy resin, comprising a process of cooling a liquid-crystalline epoxy resin to cause transition into a glassy state.

2. The production method for a glassy liquid-crystalline epoxy resin according to claim 1, wherein the glassy liquid-crystalline epoxy resin or the glassy liquid-crystalline epoxy resin composition has a nematic structure.

3. The production method for a glassy liquid-crystalline epoxy resin according to claim 1, wherein the transition into a glassy state is caused at 0° C. or higher.

4. A production method for a cured epoxy resin, comprising a process of heating the glassy liquid-crystalline epoxy resin produced by the production method according to claim 1, at a temperature at which a curing reaction of the glassy liquid-crystalline epoxy resin or the glassy liquid-crystalline epoxy resin composition is caused.

5. A production method for a glassy liquid-crystalline epoxy resin composition, comprising a process of cooling a liquid-crystalline epoxy resin composition, the liquid-crystalline epoxy resin composition comprising a liquid-crystalline epoxy resin and a curing agent, to cause transition into a glassy state.

6. The production method for a glassy liquid-crystalline epoxy resin according to claim 5, wherein the liquid-crystalline epoxy resin is a liquid-crystalline epoxy resin in a liquid state that is obtained by heating a glassy liquid-crystalline epoxy resin.

7. A production method for a cured epoxy resin, comprising a process of heating the glassy liquid-crystalline epoxy resin composition produced by the production method according to claim 5, at a temperature at which a curing reaction of the glassy liquid-crystalline epoxy resin or the glassy liquid-crystalline epoxy resin composition is caused.

8. The production method for a glassy liquid-crystalline epoxy resin composition according to claim 5, wherein the glassy liquid-crystalline epoxy resin or the glassy liquid-crystalline epoxy resin composition has a nematic structure.

9. The production method for a glassy liquid-crystalline epoxy resin composition according to claim 5, wherein the transition into a glassy state is caused at 0° C. or higher.

10. A storage method for a liquid-crystalline epoxy resin, comprising a process of cooling a liquid-crystalline epoxy resin to cause transition into a glassy state.

11. A production method for a cured epoxy resin, comprising a process of heating the glassy liquid-crystalline epoxy resin according to claim 10, at a temperature at which a curing reaction of the glassy liquid-crystalline epoxy resin or the glassy liquid-crystalline epoxy resin composition is caused.

12. A storage method for a liquid-crystalline epoxy resin composition, comprising a process of cooling a liquid-crystalline epoxy resin composition, the liquid-crystalline epoxy resin composition comprising a liquid-crystalline epoxy resin and a curing agent, to cause transition into a glassy state.

13. A production method for a cured epoxy resin, comprising a process of heating the glassy liquid-crystalline epoxy resin composition according to claim 12, at a temperature at which a curing reaction of the glassy liquid-crystalline epoxy resin or the glassy liquid-crystalline epoxy resin composition is caused.

14. A glassy liquid-crystalline epoxy resin having a liquid-crystalline structure.

15. A glassy liquid-crystalline epoxy resin composition, comprising a liquid-crystalline epoxy resin and a curing agent, and having a liquid-crystalline structure.

* * * * *